United States Patent
Burstein et al.

(10) Patent No.: US 8,467,716 B2
(45) Date of Patent: Jun. 18, 2013

(54) AUTOMATED ESSAY SCORING

(75) Inventors: Jill Burstein, Princeton, NJ (US);
Vyacheslav Andreyev, Pennington, NJ (US); Chi Lu, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 356 days.

(21) Appl. No.: 12/846,983

(22) Filed: Jul. 30, 2010

(65) Prior Publication Data

US 2010/0297596 A1 Nov. 25, 2010

Related U.S. Application Data

(63) Continuation of application No. 11/460,413, filed on Jul. 27, 2006, now Pat. No. 7,769,339, which is a continuation of application No. 10/319,623, filed on Dec. 16, 2002, now Pat. No. 7,088,949, which is a continuation-in-part of application No. 10/176,534, filed on Jun. 24, 2002, now Pat. No. 7,127,208.

(51) Int. Cl.
*G09B 11/00* (2006.01)
*G09B 7/00* (2006.01)

(52) U.S. Cl.
CPC ........................... *G09B 7/00* (2013.01)
USPC .......................................... 434/353

(58) Field of Classification Search
USPC .......................................... 434/353
See application file for complete search history.

(56) References Cited

U.S. PATENT DOCUMENTS

| | | | |
|---|---|---|---|
| 4,958,284 A | 9/1990 | Bishop et al. | |
| 4,978,305 A | 12/1990 | Kraft | |
| 5,437,554 A | 8/1995 | Clark et al. | |
| 5,458,493 A | 10/1995 | Clark et al. | |
| 5,466,159 A | 11/1995 | Clark et al. | |
| 5,558,521 A | 9/1996 | Clark et al. | |
| 5,672,060 A | 9/1997 | Poor | |
| 5,690,497 A | 11/1997 | Clark et al. | |
| 5,709,551 A | 1/1998 | Clark et al. | |

(Continued)

FOREIGN PATENT DOCUMENTS

| | | |
|---|---|---|
| GB | 2388699 A | 11/2003 |
| JP | 2004-090055 | 3/1992 |

(Continued)

OTHER PUBLICATIONS

Marcu; The Rhetorical Parsing of Natural Language Texts; Proceedings of the 35th Annual Meeting of the Assoc. for Computational Linguistics; pp. 96-103; 1997.

(Continued)

*Primary Examiner* — Kathleen Mosser
(74) *Attorney, Agent, or Firm* — Jones Day

(57) ABSTRACT

Systems and methods for building a trait model for essay evaluation are provided. At least one evaluated essay is received. A plurality of features pertaining to one or more traits from the at least one evaluated essay are identified and extracted. The one or more traits comprise writing errors, discourse, or vocabulary usage. A plurality of vector files based upon the plurality of features are created. A trait model for essay evaluation based upon the plurality of vector files is built. The trait model is evaluated, where the evaluation includes mapping features of a new essay to the trait model by navigating a multi-branched decision tree. At each branch of the decision tree, a value associated with the features of the new essay is used to determine how to proceed through the trait model.

42 Claims, 9 Drawing Sheets

U.S. PATENT DOCUMENTS

| | | | |
|---|---|---|---|
| 5,716,213 | A | 2/1998 | Clark et al. |
| 5,718,591 | A | 2/1998 | Clark et al. |
| 5,735,694 | A | 4/1998 | Clark et al. |
| 5,752,836 | A | 5/1998 | Clark et al. |
| 5,827,070 | A | 10/1998 | Kershaw et al. |
| 5,878,386 | A | 3/1999 | Coughlin |
| 5,987,302 | A | 11/1999 | Driscoll et al. |
| 6,115,683 | A | 9/2000 | Burstein et al. |
| 6,155,839 | A | 12/2000 | Clark et al. |
| 6,159,018 | A | 12/2000 | Clark et al. |
| 6,168,440 | B1 | 1/2001 | Clark et al. |
| 6,181,909 | B1 | 1/2001 | Burstein et al. |
| 6,183,260 | B1 | 2/2001 | Clark et al. |
| 6,183,261 | B1 | 2/2001 | Clark et al. |
| 6,193,521 | B1 | 2/2001 | Clark et al. |
| 6,267,601 | B1 | 7/2001 | Jongsma et al. |
| 6,332,143 | B1 | 12/2001 | Chase |
| 6,356,864 | B1 | 3/2002 | Foltz et al. |
| 6,366,759 | B1 | 4/2002 | Burstein et al. |
| 6,461,166 | B1 | 10/2002 | Berman |
| 6,558,166 | B1 | 5/2003 | Clark et al. |
| 6,796,800 | B2 | 9/2004 | Burstein et al. |
| 7,127,208 | B2 | 10/2006 | Burstein et al. |
| 2002/0083104 | A1 | 6/2002 | Polanyi et al. |
| 2002/0142277 | A1 | 10/2002 | Burstein et al. |
| 2003/0031996 | A1 | 2/2003 | Robinson |
| 2003/0138758 | A1 | 7/2003 | Burstein et al. |
| 2003/0149692 | A1 | 8/2003 | Mitchell |
| 2004/0175687 | A1 | 9/2004 | Burstein et al. |
| 2005/0042592 | A1 | 2/2005 | Burstein et al. |
| 2007/0077542 | A1 | 4/2007 | Burstein et al. |

FOREIGN PATENT DOCUMENTS

| | | |
|---|---|---|
| JP | 2006-231178 | 8/1994 |
| JP | 2007-182373 | 7/1995 |
| JP | 2009-016630 | 1/1997 |
| JP | 2009-016631 | 1/1997 |
| JP | 2000-029894 | 1/2000 |
| WO | WO 02/059857 A1 | 8/2002 |
| WO | WO 2004/001700 A1 | 12/2003 |
| WO | WO 2004/003689 A2 | 1/2004 |
| WO | WO 2004/061593 A2 | 7/2004 |

OTHER PUBLICATIONS

Mann et al.; Rhetorical Structure Theory: Toward a Functional Theory of Text Organization; Text 8(3); pp. 243-281; 1988.

Daume et al.; The Importance of Lexicalized Syntax Models for Natural Language Generation Tasks; Proc. of the 2nd Int'l Conference on Natural Language Generation; 2002.

Carlson et al.; An Empirical Study of the Relation Between Abstracts, Extracts and the Discourse Structure of Texts; Proc. of the Document Understanding Conference (DUC-2001); New Orleans, LA; Sep. 13-14, 2001.

Marcu; The Theory and Practice of Discourse Parsing and Summarization; MIT Press; 2000 (TOC).

Harada et al.; Automatic Extraction of the Subject Bearing Sentences; School of Library and Information Science; Keio University, Tokyo; pp. 17-26 (w/ English Abstract); 1993.

Shermis et al.; Trait Ratings for Automated Essay Grading; Indiana University, Purdue University, Indianapolis; Apr. 21, 1999.

Page et al.; Computer Analysis of Student Essays: Finding Trait Differences in Student Profile; Ann. Mtg. of the American Educational Research Assoc.; Chicago, IL; Mar. 1997.

Shermis et al.; Trait Ratings for Automated Essay Grading; Educational and Psychological Measurement; vol. 62; pp. 5-18; 2002.

Chodorow et al.; An Unsupervised Method for Detecting Grammatical Errors; Proc. of 1st Ann. Mtg. of N. Am. Ch. of the Assoc. for Computational Linguistics; pp. 140-147; 2000.

Salton; Automatic Text Processing: The Transformation, Analysis, and Retrieval of Information by Computer; Addison-Wesley Series in Computer Science; Table of Contents; 1989.

Burstein et al.; Automated Essay Scoring for Non Native English Speakers; pp. 68-75; 1999.

Burstein; The E-rater Scoring Engine: Automated Essay Scoring With Natural Language Processing; Automated Essay Scoring; Ch. 7; pp. 113-121; 2003.

Elliot; IntelliMetric: From Here to Validity; Automated Essay Scoring; Ch. 5; pp. 71-86; 2003.

Landauer et al.; Automated Scoring and Annotation of Essays with the Intelligent Essay Assessor; Automated Scoring of Essay Content; Ch. 6; pp. 87-112; 2003.

Page; Project Essay Grade: PEG; Project Essay Grade (PEG); Ch. 3; pp. 43-54; 2003.

Quirk et al.; A Comprehensive Grammar of the English Language; Longman Group Limited; 1985; Table of Contents.

Larkey; Automated Essay Grading Using Text Categorization Techniques; Center for Intelligent Information Retrieval; Amherst, MA; pp. 90-95; 1998.

Krippendorff; Conent Analysis: An Introduction to Its Methodology; vol. 5, The SAGE CommText Series; 1980; Table of Contents.

Keith; Validity of Automated Essay Scoring Systems; Automated Essay Scoring; Ch. 9; pp. 147-167; 2003.

Burstein et al.; Finding the Write Stuff: Automatic Identification of Discourse Structure in Student Essays; Natural Language Processing; IEEE Computer Society; p. 32-39; 2003.

Burstein et al.; Directions in Automated Essay Analysis; The Oxford Handbook of Applied Linguistics; Ch. 37; pp. 487-497; 2002.

Burstein et al.; Automated Scoring Using a Hybrid Feature Identification Technique; Ann. Mtg of the Assoc. of Computational Linguistics; Montreal, Canada; 1998.

Regression Modeling; http://www.kellogg.nwu.edu/faculty/weber/emp/Modeling.htm.; 2002.

Linear Models (Statistics Toolbox): Stepwise Regression Diagnostics Table; http://www.mathworks.com/access/helpdesk/help/toolbox/stats/linear19.shtml.; 2002.

Linear Models (Statistics Toolbox): Stepwise Regression; http://www.mathworks.com/access/helpdesk/help/toolbox/stats/linear16.shtml.; 2002.

Burstein et al.; Towards Automatic Classification of Discourse Elements in Essays; Ann. Mtg on Assoc. for Computational Linguistics; Toulouse, France; pp. 98-105; 2001.

AUTOMATED ESSAY SCORING

CROSS-REFERENCE

This application is a continuation of the U.S. patent application Ser. No. 11/460,413, entitled "Automated Essay Scoring," filed on Jul. 27, 2006 now U.S. Pat. No. 7,769,339. This application and the '413 application claim priority to and the benefit of the U.S. patent application Ser. No. 10/319,623, entitled "Automated Essay Scoring," filed on Dec. 16, 2002 now U.S. Pat. No. 7,088,949, which is a continuation-in-part of U.S. patent application Ser. No. 10/176,534, entitled "Automated Annotation," filed on Jun. 24, 2002 now U.S. Pat. No. 7,127,208. All of these are hereby incorporated into the present application by reference.

FIELD

This invention relates generally to essay evaluation. More particularly, the invention pertains to determining a score for an essay.

BACKGROUND

Practical writing experience is generally regarded as an effective method of developing writing skills. Literature pertaining to the teaching of writing suggests that, practice and critical evaluation may facilitate improvements in a students' writing abilities, specifically with regard to essay organization. In traditional writing classes, an instructor may provide this essay evaluation to the student. However, attending writing classes may be inconvenient and/or prohibitively expensive. In this regard, conventional automated essay scoring applications are now an established capability used from elementary school through graduate school for purposes of instruction and assessment.

Furthermore, conventional automated essay scoring applications are currently being used in standardized tests and entrance exams. However, in comparison to human evaluators, conventional automated essay scoring applications may not perform as well. One reason for this performance disparity may be related to differences in scoring methodology between human evaluators and conventional automated essay scoring applications. For example, human evaluators typically utilize a "holistic" scoring approach. In this approach, an essay may be read over quickly for an "overall" impression and readability, other criteria (e.g., grammar, mechanics, style, organization, development, vocabulary usage, etc.) may then be evaluated, and a final score may be based on a combination of these aspects. Using this holistic approach, evaluation performance is typically improved by increasing the number of criteria examined by the human evaluators.

Conversely, the evaluation performance of conventional automated essay scoring applications may decrease as the number of criteria examined is increased beyond a relatively low number of criteria. Therefore, conventional automated essay scoring applications may make use of a relatively small subset of possible criteria. This may, in turn, result in scoring anomalies and may account for the difference in scores between human evaluators and conventional automated essay scoring applications.

SUMMARY

In accordance with an embodiment, the invention pertains to a method of determining a score for an essay. In this method, the essay is applied to a plurality of trait models and a plurality of trait scores are determined based on the plurality of trait models. Each of these trait scores having been generated from a respective trait model. In addition, the score is determined based on the plurality of trait scores.

GLOSSARY OF TERMS

While dictionary meanings are implied by terms used herein, the following definitions may also be helpful.

Constituent
A constituent is, in general, a component, a part of a whole, or the like.

Discourse
Discourse is verbal expression in speech or writing.

Discourse Element
A discourse element is a constituent of written or verbal expression e.g., title, introductory material, thesis statement, main idea, supporting idea, conclusion, etc.

Essay
An essay refers to text, e.g., written words, transcribed speech, and the like.

Feature
A feature of an essay is a constituent of that essay, e.g., word, phrase, sentence, paragraph, punctuation, etc.

Mapping
The process of applying a vector to a model. Generally, a vector associated with a feature is "overlaid" upon the model to obtain a result. For example, in a model built upon a decision tree data structure, at each node of the decision tree, the vector information is utilized to determine which branch to follow.

Mean Score
A mean score is an average value of a set of numbers, e.g., a result that typifies a set of results. The mean score may be determined utilizing various equations, such as, geometric mean, arithmetic mean, and the like.

Model
A data structure generated in response to one or more features of a corpus of evaluated essays (corpus). By comparing (e.g., overlaying, modeling, etc.) these features of a new essay to the model, the evaluations of the corpus may be correlated to the new essay. Examples of data structures may include a multi-branched decision tree, linked list, array, relational, hierarchical, geographic, and the like.

Stoplist
A list containing one or more features having an essentially negligible or negative impact upon the accuracy of essay evaluations.

Trait
A trait is one or more substantially related essay features and/or feature sets. For example, a writing errors trait may include features and/or feature sets pertaining to errors of grammar (e.g., ill-formed verbs, sentence fragments, etc.), writing mechanics (e.g., misspelling, improper capitalization, etc.), word usage (e.g., misused homophones, etc.), style errors (e.g., repetitious word use, inappropriate word use, etc.), and the like.

Trait Model
A trait model is a model based on a group of related features.

Vector
A vector is one or more quantities (e.g., magnitude and direction, values, etc.) attributes, characteristics, and/or qualities associated with a feature.

Vector File

A collection vectors related to an essay. In general, these vectors may be collected in a computer document and/or associated via linked list or some other relational data structure.

BRIEF DESCRIPTION OF THE DRAWINGS

Embodiments of the invention are illustrated by way of example and not limitation in the accompanying figures in which like numeral references refer to like elements, and wherein.

DETAILED DESCRIPTION

For simplicity and illustrative purposes, the principles of the invention are described by referring mainly to an embodiment thereof. In the following description, numerous specific details are set forth in order to provide a thorough understanding of the invention. It will be apparent however, to one of ordinary skill in the art, that the invention may be practiced without limitation to these specific details. In other instances, well known methods and structures have not been described in detail so as not to unnecessarily obscure the invention.

In the following description various embodiments of an automated essay evaluation system, along with methods of construction and use are provided. The examples hereinbelow refer to the evaluation of an essay utilizing models generated by focusing on several particular traits, namely: 1) writing errors; 2) discourse; 3) vocabulary usage; and 4) advisory. However, it is to be understood that the embodiments of the invention are not limited to the evaluation of essays with these particular models. Instead, other embodiments of the invention may utilized any reasonable number of suitable models to evaluate an essay.

Figure 1:
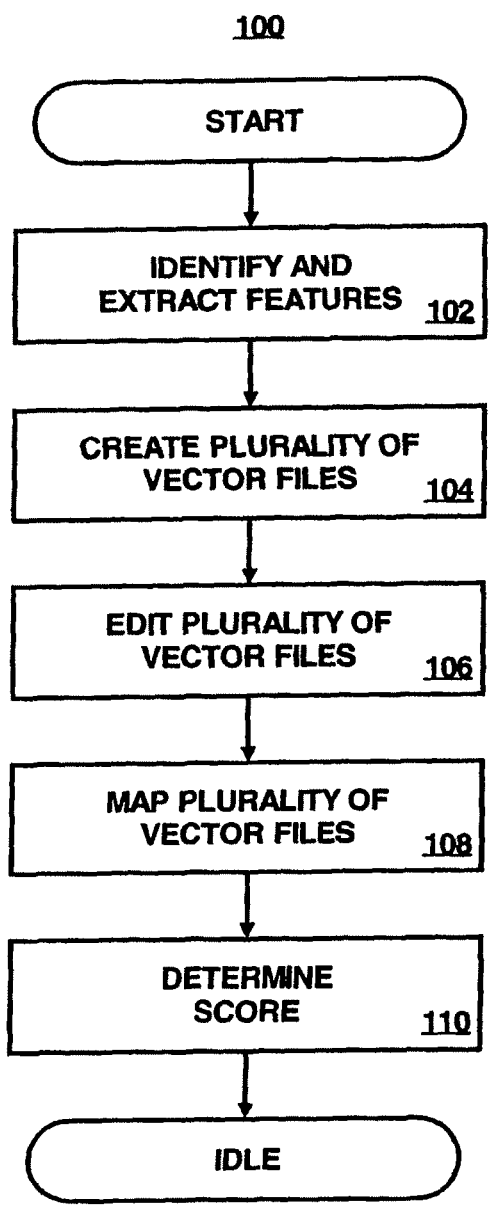
FIG. 1 is a flow diagram of a method of essay evaluation according to an embodiment of the invention.

FIG. 1 is a flow diagram of a method 100 for automated essay evaluation according to an embodiment of the invention. The method 100 may be implemented on any suitable computer system and/or over any suitable computer network. The method 100 is initiated in response to receiving an essay.

In the following description of steps 102-106, the process of generating a typical vector file is described. Generation of specific examples vector files is presented in the description of FIG. 3 hereinbelow. Furthermore, as described in greater detail hereinbelow, the features utilized to generate the vector files may be grouped by trait, with one vector file including the features of one trait (e.g., group of related features). Moreover, the traits utilized to generate the vector files may substantially correspond to the features utilized to generate the models. Thus, each model may be described as a trait model.

At step 102, features of the essay (e.g., words, phrases, sentences, paragraphs, and the like) may be identified and extracted from the essay. For example, one or more parsers may be configured to identify each word in the essay. Each of these identified words may be extracted (e.g., copied, moved from the essay, etc.) in order to create vector file in subsequent steps. In addition, other processing of the essay and/or the identified features may be performed at step 102. For example, features having been empirically determined to increase the complexity of the analysis without contributing to the reliability of the result, may be removed and/or ignored.

At step 104, a plurality of vector files may be created based on the features extracted at step 102. In this regard, information associated with the identified features may be stored to the plurality of vector files. For example a list of identified words may be stored to a vector file. In this vector file, each identified word and/or an associated feature identifier may be stored to a separate line, for example.

At step 106, vector information corresponding to the identified features may be determined and stored to the plurality of vector files. In general, this vector information may include one or more quantities, attributes, characteristics, and/or qualities associated with the features. For example, a paragraph identified as a feature of the essay may include some or all of the following vector information: absolute position (e.g., 1, 2, 3 . . . ); relative position, length, in words, of the paragraph; length, in sentences, of the paragraph; presence of pre-determined words in the paragraph; and the like.

Furthermore, it is to be understood that the steps 102-106 need not be performed in the order presented hereinabove, but rather, may be performed in any suitable order, subsumed into 1 or 2 steps, or expanded into 4 or more steps, and that any of these variations are within the scope of embodiments of the invention.

Figure 4:
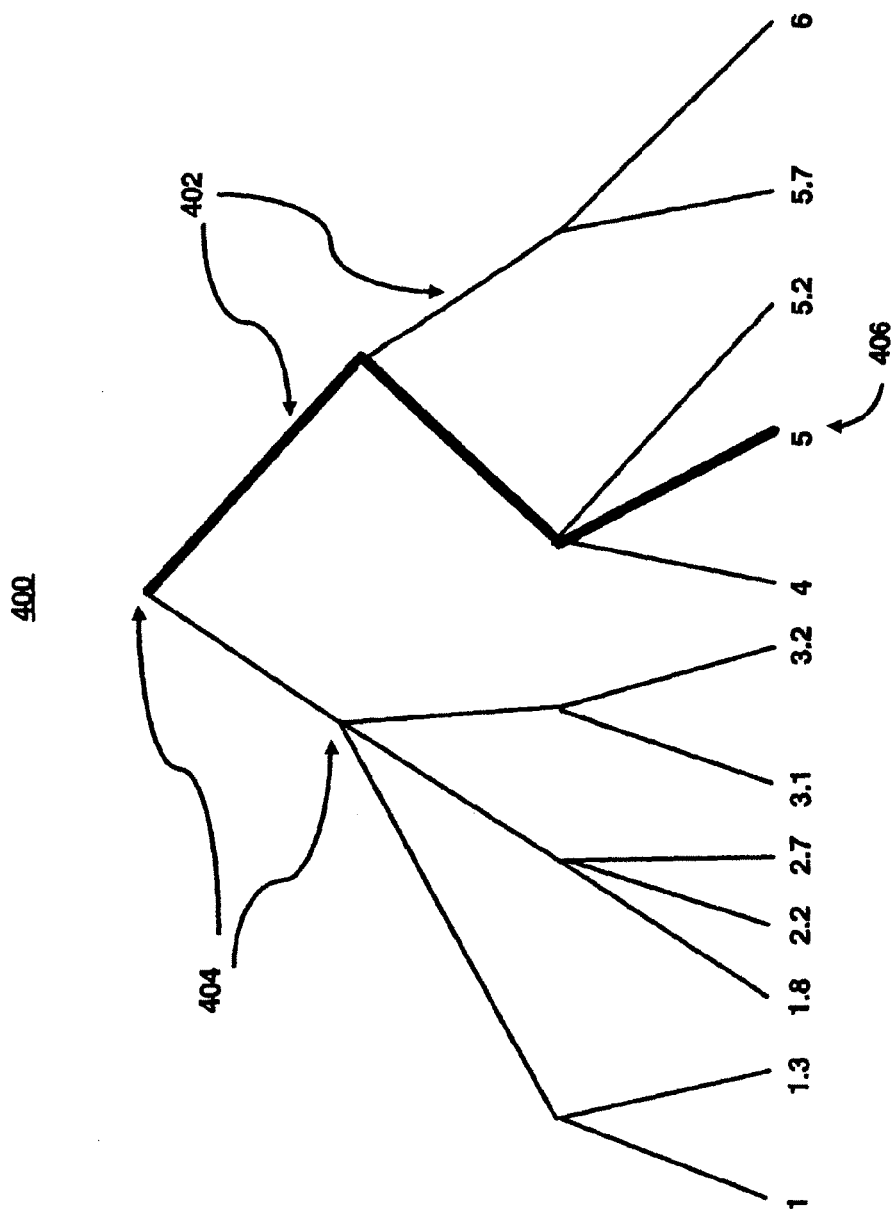
FIG. 4 is a diagram of a trait model according to an embodiment of the invention.

At step 108, the plurality of vector files may be mapped to respective models. In general, the process of mapping involves applying a vector file to a data structure called the model. More particularly, the information within the vector file is compared to the model to determine similarities between the essay and a corpus of evaluated essay utilized to construct the model. The specific method of mapping the vector file to the model may depend upon the form of the model. In this regard, a decision tree data structure may be navigated by determining, at each node, which branch to follow. An example of a decision tree model and this mapping process is illustrated in FIG. 4 and described hereinbelow.

In one embodiment, a stepwise regression model including a predetermined importance (e.g., weight) of each vector may be applied to the vector file to determine a result. In this manner, the magnitude and/or direction (e.g., vector, path, etc.) of travel through the model may be determined. At the completion of the mapping process, a result (e.g., score) is returned. As each model may be associated with a trait, this result may be described as a trait result or trait score. This process may be repeated for each vector file and/or each feature in the plurality of vector files, and respective results may be returned for each mapping event. It is to be understood, however, that while specific examples of data structures are presented herein, any suitable data structure may be utilized in various embodiments, and thus, other methods of navigation are within the scope of embodiments of the invention.

At step 110, a score, based on the scores (e.g., trait scores) determined at step 108, is determined. According to one embodiment, the score is determined from the mean of the scores determined at step 108. In this manner, disadvantages related to "over-fitting" the model may be avoided. Restated, it has been determined that incorporating a relatively large number of features into a single conventional model results in a reduction of system accuracy. Thus, embodiments as discussed herein, may avoid system accuracy degradation as feature numbers increase.

Figure 2:
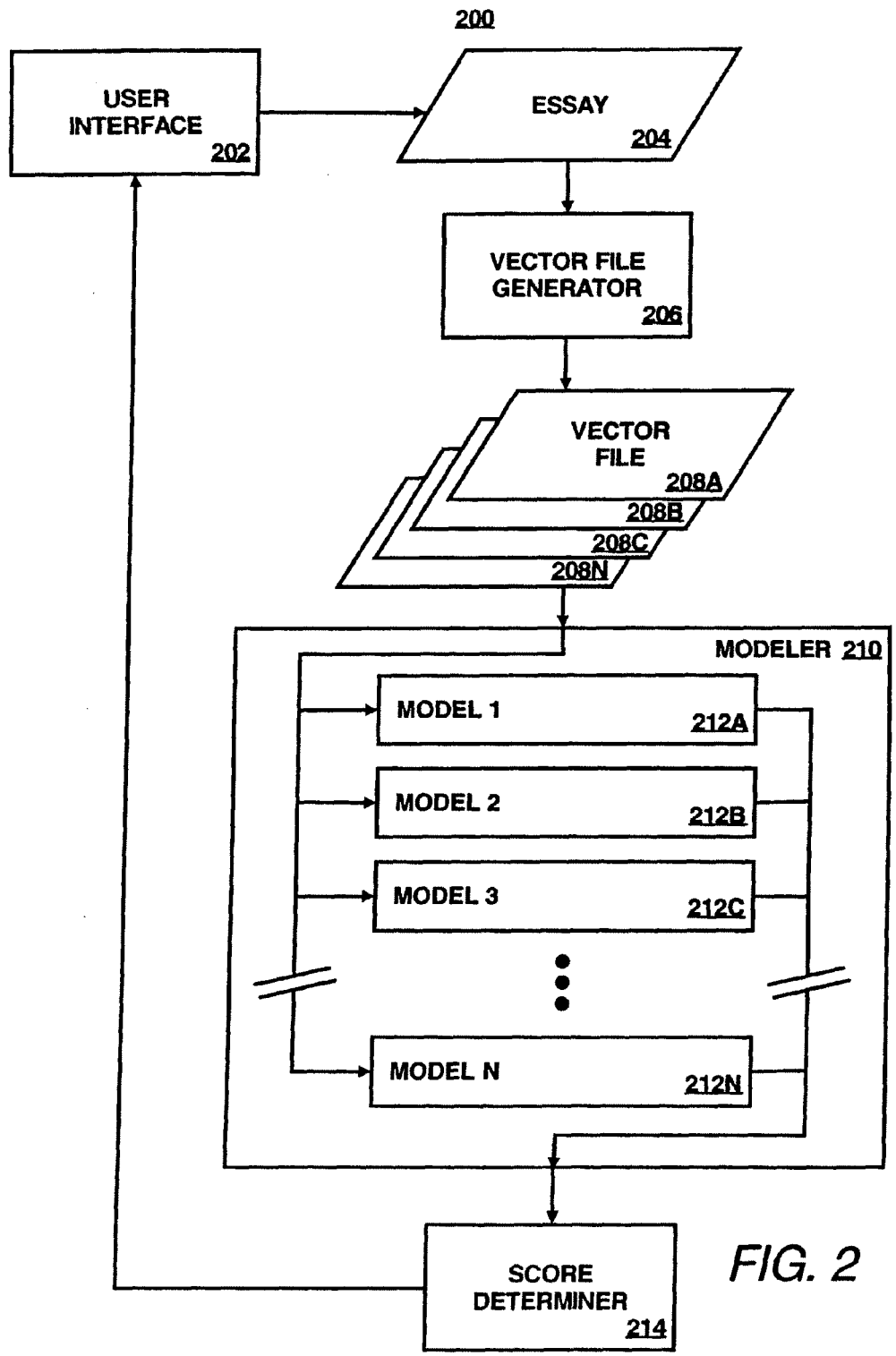
FIG. 2 is a block diagram of an architecture for an embodiment of an automated essay evaluation application.

FIG. 2 is a block diagram of an architecture for an embodiment of an automated essay evaluation application ("AEEA") 200. As shown in FIG. 2, the AEEA 200 includes a user interface 202 configured to display essay questions, accept an essay 204 and/or to output an evaluated (e.g., scored, graded, commented, and the like) essay to the user. For example, the user interface 202 may display a question prompting the user to enter the essay 204. In an embodiment of the invention, the essay 204 may be keyed into a keyboard and the score (e.g., A to F, 1 to 6, 0% to 100%, etc.) and/or an evaluated essay may be displayed on a display (see FIG. 8). The user interface 202 is further configured to forward the essay 204 to a vector file generator 206 and receive the score and/or the evaluated essay from a score determiner 214.

While not shown in FIG. 2 (see FIG. 3), the vector file generator 206 may include one or more parsers configured to extract features from the essay 204, determine vectors for the features and generate one or more vector files 208a-208n. Additionally, the vector file generator 206 may forward the one or more vector files 208a-208n to a modeler 210.

The modeler 210 is configured to map the one or more vector files 208a-208n to one or more models 212a-212n. According to an embodiment of the invention, each of the one or more vector files 208a-208n is mapped to a corresponding model 212a-212n. For example, as a vector file, e.g., 208a, is "mapped" (e.g., overlaid, compared, etc.) to a corresponding model, e.g., 212a, a result is determined. In general, the process of mapping involves navigating a data structure, such as, a multi-branched decision tree (e.g., model 212a). At each branch in the decision tree, a value associated with a feature (from the vector file) is utilized to determine how to proceed through the model 212a. An example of this process is illustrated in FIG. 4. In this manner, a path through the model 212a may be determined. At the completion of the mapping process a score is returned. This process may be repeated for each vector file 208b-208n and/or each feature (e.g., entry) in the one or more vector files 208a-208n and a score may be returned for each mapping event. These scores may be forwarded to a score determiner 214.

The score determiner 214 may be configured to receive scores from the modeler 210 and calculate an essay score based on these mapping scores. According to an embodiment of the invention, the essay score may be a mean value of the scores. For example, a mean value may be calculated utilizing one or more of the following equations:

$$\text{essay score} = (score_a + score_b + score_c + \ldots + score_n)/n \quad \text{eqn. 1}$$

$$\text{essay score} = \sqrt[n]{score_a * score_b * score_c * \ldots * score_n} \quad \text{eqn. 2}$$

Furthermore, while in the above included equation examples, an arithmetic mean (eqn. 1) and a geometric mean (eqn. 2) have been provided, it is within the scope of various embodiments of the invention, that a mean value of a binomial distribution, mean of a distribution function, Gaussian and Poisson distribution, a voting algorithm, and the like be utilized to determine the essay score. Moreover, the score determiner 214 may be configured to forward the essay score to the user interface 202.

Figure 3:
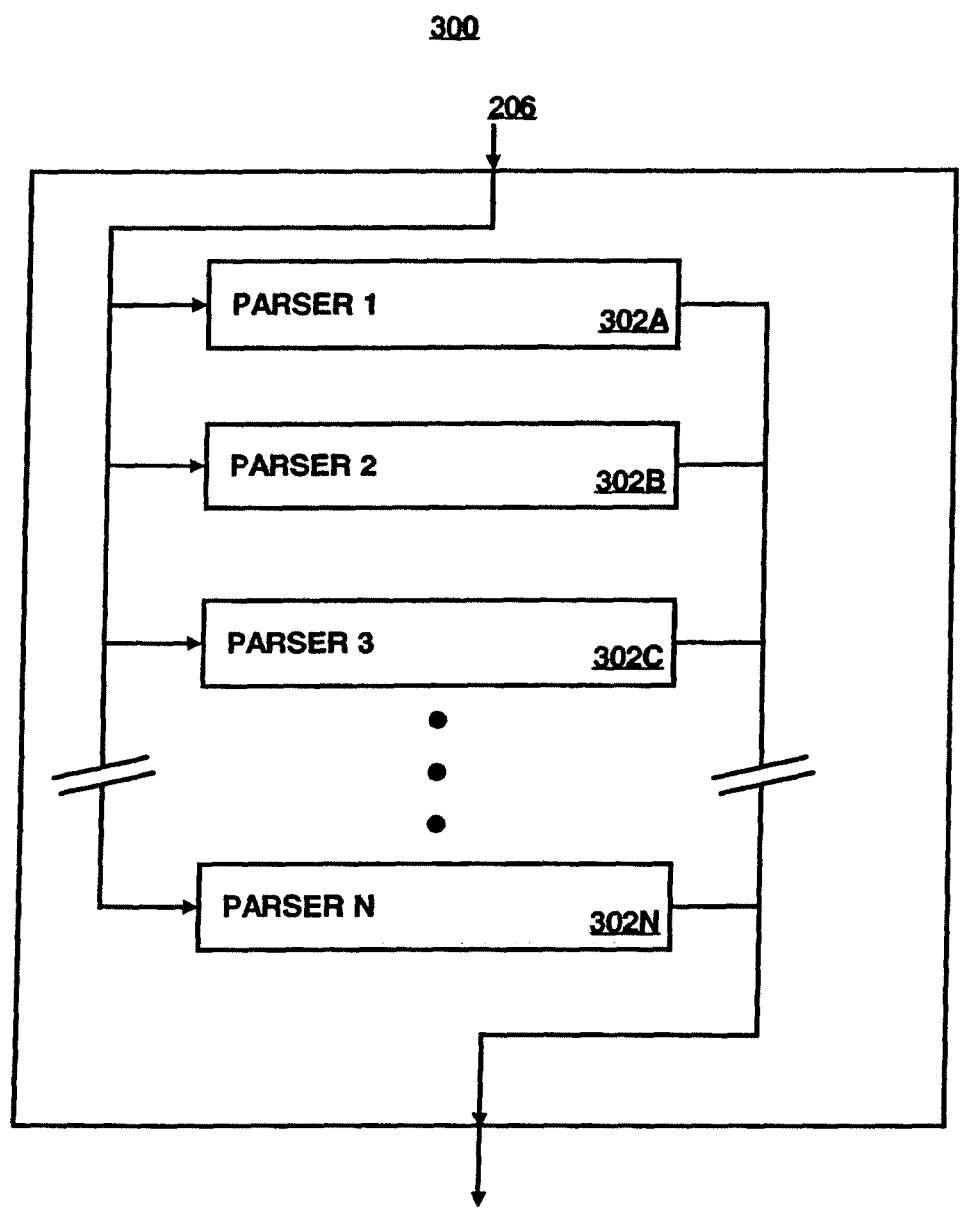
FIG. 3 is a block diagram of a detail of the architecture shown in FIG. 2 according to an embodiment of the invention.

FIG. 3 is a more detailed block diagram of the vector file generator 206 shown in FIG. 2 according to an embodiment of the invention. As shown in FIG. 3, the vector file generator 206 includes a plurality of parsers 302a-302n. In general, the plurality of parsers 302a-302n are configured to receive the essay 204, extract features from the essay 204, determine vectors for the features and generate the one or more vector files 208a-208n as described hereinabove. The particular features extracted may depend upon the respective traits utilized to generate the plurality of models 212a-212n. Thus, the particular features extracted may differ between the plurality of parsers 302a-302n. In this regard, although the input data (e.g., the essay 204) may be essentially the same for each of the plurality of parsers 302a-302n, the vector files generated (e.g., 208a-208n) may differ.

Additionally, the vector file generator 206 may forward the one or more vector files 208a-208n to the modeler 210. More particularly, each of the plurality parsers 302a-302n may be configured to extract features pertaining to a particular trait and determine vectors associated with these features. In this regard, each of these traits may include one or more features and/or feature sets and each of these feature sets may include one or more features. Thus, the total number of features extracted from the essay 204 may be 10, 50, 100 or more. In general, the parsers 302a-302n may identify these features utilizing rule-based and/or statistical language modeling strategies. The strategies are described in, "Chodorow, Martin and Leacock, Claudia. 2000. An unsupervised method for detecting grammatical errors. In Proceedings of the 1st Annual Meeting of the North American Chapter of the Association for Computational Linguistics, 140-147," and which is hereby incorporated in its entirety. In the following description, an example will be made of 4 particular traits, however, these traits are provided for illustrative purposes only and thus, embodiments of the invention are not limited to these traits.

In an embodiment of invention, the parsers 302a-302n are configured to extract features pertaining to the following traits: I) writing errors; II) discourse; III) vocabulary usage; and IV) advisory; respectively. In an embodiment, the writing errors trait may include at least the following feature sets: 1) grammar; 2) mechanics; 3) usage errors; and 4) style errors. The grammar error feature set may include an accumulated count of the following grammar errors: A) subject-verb agreement; B) ill-formed verbs; C) sentence fragments; D) missing possessive; and E) pronoun errors. The mechanics error feature set may include a count of the following error types: A) misspelling; B) capitalization of proper nouns; and C) punctuation (e.g., missing comma or sentence final punctuation). The usage error feature set may include a count of misused homophones (e.g., their, instead of there). The style errors feature set may include a count of: A) repetitious word use; B) inappropriate word use; and C) disproportionate number of short and/or long sentences.

In the following Table 1, an example of a vector file for the writing errors trait is presented. In order to generate this writing errors vector file, a file including a line entry for each of the abovementioned errors is created. These writing errors are searched for within the essay 204 and the file is modified in accordance with the errors identified. In a specific example, a parser, e.g., 302a, may be configured to identify misspelled words. The parser 302a may, accordingly, compare each word in the essay 204 to a list of correctly spelled words. In this manner, the parser 302a may identify each misspelling instance and may, further, maintain an accumulated count of misspelling instances. Upon completion of the parse of the essay 204, the parser 302a may record the accumulated count in the appropriate location within the vector file. Thus, as shown in row 1:2, column A, six (6) miss spelled features (word) were identified in the essay 204.

TABLE 1

| Feature Set | A | B | C | D | E |
|---|---|---|---|---|---|
| I:1 | 1, | 0, | 2, | 0, | 0, |
| I:2 | 6, | 0, | 2, | N/A, | N/A, |
| I:3 | 0, | N/A, | N/A, | N/A, | N/A, |
| I:4 | 1, | 1, | 0, | N/A, | N/A, |

As shown in Table 1, the example of the writing errors vector file includes 5 rows, a column header and one for each feature set. In an embodiment of the invention, the first row represents a column header, the first column is a feature set identifier and the remainder of the columns are feature identifiers. In various another embodiments, the column header and/or the feature set identifiers may not be present. The values within the columns indicated above by column headers A to E are associated with features (corresponding to features presented hereinabove).

The parser, e.g., 302b, configured to extract features pertaining to the discourse trait may identify one or more discourse elements from the essay 204 and extract the following features from these discourse elements: 1) an absolute count of sentences (e.g., total number of sentences in the element); 2) a proportion of total words, based on total words in the essay 204 (e.g., the total number of words in the element:: total number of words in the essay); 3) a proportion of non-stoplist words, based on total words in the essay (e.g., total number of non stop list words in the element::total number of words in the essay); 4) a proportion of non-stoplist words in essay, based on total number of words (e.g., total number of non stop list words in the essay::total number of words in the essay).

The particular discourse elements identified may include: introductory material, thesis statement, main idea, supporting idea, conclusion, and "other". In general, the introductory material segments provide the context in which the thesis, a main idea, or the conclusion is to be interpreted. The thesis segments typically state the writer's position statement. The main idea segments make explicit the main message that the author wants to convey in conjunction with the essay's thesis. The supporting idea segments provide evidence and support the claims made in the main ideas, thesis statements, or conclusions. The conclusion segments summarize the entire argument developed in an essay. The "other" segments include text associated with titles and salutations, and irrelevant or incomprehensible text. It is to be understood, while the identified discourse elements are described, it is within the scope of other embodiments of the invention that any reasonable number of suitable discourse elements may be identified.

Additionally, the stoplist utilized in association with parsing the discourse trait may include words that do not typically reflect essay topics, e.g., function words and general essay vocabulary, such as, "agree" and "opinion." Words included in this stoplist and other stoplists associated with parsing other traits may be removed (e.g., deleted, ignored, etc.) from the essay prior to parsing and/or from the parsed data.

In order to evaluate discourse elements of the essay 204, a parser 302c identifies a plurality syntactic structures (e.g., a syntactic parser), such as subjunctive auxiliary verbs (e.g., would, should, might), and complex clausal structures, such as complement, infinitive, and subordinate clauses. Based on the output of the syntactic parser, the discourse vector file may be modified as described herein. Specific examples of syntactic structures extracted (e.g., parsed) from the essay 204 may include lexical features (cues), general vocabulary, "key" terms, and punctuation. In this regard, the syntactic parser may be configured to parse each identified sentence for the presence of a pre-defined lexical feature and, if found, modify the corresponding feature in the vector file.

These lexical features may also be described as "cues" (e.g., indicators, guides, etc.) due to their association with discourse elements. In general, cues may include words, terms, phrases, syntactic structures, and the like. Cues typically associated with particular discourse elements may be identified and in this manner, a cue may be utilized to indicate a particular sentence is a particular discourse element. For example, the phrase, "in conclusion" is typically associated with the conclusion statement. Other examples include words such as, "opinion" and "feel" being generally associated with the thesis statement. Other features having been predetermined to be associated with specific discourse marker words and terms may also be identified. For example, the words, "agree" and "disagree" may be associated with identification of an argument. In another example, words such as, "this" and "these" may indicate that the topic being discussed has not changed.

In addition, key terms associated with various discourse relationships may be identified. For example, the words, "first", "second", "third", and "finally" may be associated with parallel discourse relationships. In another example, words such as, "however" and "alternatively" may be associated with a contrasting discourse relationship. Furthermore, punctuation having been pre-determined to be associated with particular discourse elements may be identified. For example, an exclamation point at the end of a sentence may indicate a relatively low probability that the sentence is a thesis or conclusion statement and a relatively high probability that the sentence is a supporting sentence. In the following Table 2, an example of a vector file for the discourse trait is presented.

TABLE 2

| Discourse Element | Sentence Count | Percent of Words | Percent of Stoplist | Percent of Non-Stoplist |
|---|---|---|---|---|
| Intro | 3, | 8, | 0, | 12, |
| Thesis | 1, | 4, | 14, | 3, |
| Main | 1, | 4, | 5, | 9, |
| Support1 | 5, | 10, | 8, | 9, |
| Support2 | 7, | 12, | 2, | 19, |
| Conclusion | 3, | 8, | 22, | 6, |
| Title | 1, | 2, | 0, | 4, |
| Irrelevant1 | 4, | 4, | 19, | 6, |
| Irrelevant2 | 12, | 48, | 30, | 21, |

As shown in Table 2, the example of the discourse vector file includes 10 rows, a column header and one for each identified discourse element. In an embodiment of the invention, the first row represents a column header, the first column is a discourse element identifier and the remainder of the columns are feature identifiers. In various another embodiments, the column header and/or the feature set identifiers may not be present.

To capture use of vocabulary, a parser, e.g., 302d, is configured to utilize content vector analyses that are based on the vector-space model. Content vector analysis and vector-space modeling are described in, "Salton G. (1989). Automatic text processing: The transformation, analysis, and retrieval of information by computer. New York: Addison-Wesley Publishing," which is hereby incorporated in its entirety.

Although not shown in FIG. 3, training essays are converted into vectors of word frequencies, and the frequencies are then transformed into word weights, where the weight of a word is directly proportional to its frequency in the essay but inversely related to number of essays in which it appears. To calculate the topical analysis of the essay 204, the essay 204 is converted into a vector of word weights, and a search is conducted to find the training vectors most similar to it. Measures of similarity may be measured by the cosine of the angle between two vectors.

According to an embodiment, for a feature (termed, "topical analysis by essay"), the test vector consists of all the words in the essay 204. The value of the feature is the mean of the scores of the most similar training vectors. For other feature, topical analysis by argument, vocabulary usage at the argument level may be evaluated. The discourse analysis may be utilized to partition the essay 204 into its main discussion points, and a vector is created for each discussion point. These argument vectors are individually compared to the training set so that a topical analysis score may be assigned to each argument. The value for this feature is a mean of the argument scores. These concepts are described in greater detail in, "Burstein, J. and Chodorow, M. (1999). Automated Essay Scoring for Nonnative English Speakers. Proceedings of the Workshop on Computer-Mediated Language Assessment and Evaluation of Natural Language Processing. Joint Symposium of the Association of Computational Linguistics and the International Association of Language Learning Technologies, College Park, Md. 68-75," which is hereby incorporated in its entirety.

The parser 302d is further configured to utilize this content vector analyses to derive three, vocabulary usage related, features: 1) a score (e.g., 1 to 6, 0% to 100%, etc.) based on a content vector analysis measure; 2) the highest cosine value used to determine the essay score; and 3) the vector length, based on the vector construction generated for input to the content vector analysis measure. The three measures are derived as follows.

A content vector analysis program within a parser 302a-302n (not shown in FIG. 3) is configured to compute an essay score, e.g., 1 to 6. To do this, the vocabulary of each score category is converted to a single vector whose elements represent the total frequency of each word in a training essays for that category. In effect, this merges the essays for each of the score points, 1 through 6. (The stoplist of some function words is removed prior to vector construction.) The word frequency vectors for the six score categories, described above, are converted to vectors of word weights. The weight for word "i" in score category "s" may be calculated utilizing the following equation:

$$\text{weight}_{i,s} = (\text{freq}_{i,s}/\text{max\_freq}_s) * \log(n\_\text{essays}_{total}/n\_\text{essays}_i) \quad \text{eqn. 3}$$

Wherein: $\text{weight}_{i,s}$ is the weight of the word i in an essay having a score s; $\text{freq}_{i,s}$ is a frequency of the word i in the essay having said score s; $\text{max\_freq}_s$ is a maximum frequency of the word i in a previously evaluated essay having the score s of the previously evaluated essays; $n\_\text{essays}_{total}$ is a total number of the previously evaluated essays; and $n\_\text{essays}_i$ is a number of previously evaluated essay having the word i of the previously evaluated essays.

The parser 302a-302n may be configured to compute cosine correlations between the vector for the essay 204 and the six vectors representing the trained categories (i.e., score points 1 through 6). The category that is most similar to the essay 204 (i.e., has the highest cosine value) is assigned a final score from 1 to 6 based on the evaluation of its vocabulary. In the following Table 3, an example of a vector file for the vocabulary usage trait is presented.

TABLE 3

| Feature | Score | Highest Cosine | Vector Length |
|---|---|---|---|
| Intro | 3, | 0.62, | 5, |
| Thesis | 5, | 0.55, | 14, |
| Main | 6, | 0.45, | 12, |
| Support1 | 3, | 0.58, | 8, |
| Support2 | 5, | 0.36, | 10, |
| Conclusion | 5, | 0.44, | 22, |
| Title | 4, | 0.28, | 2, |
| Irrelevant1 | 1, | 0.13, | 12, |
| Irrelevant2 | 1, | 0.11, | 18, |

As shown in the above Table 3, a score, highest cosine value, and vector length value are included in the vector for each of the identified features. In an embodiment, these features may correspond to the discourse elements identified during the generation of the discourse relevant vector file. In this regard, it is within the scope of embodiments of the invention that modules within the AEEA 200 may intercommunicate and exchange such information.

In general, evaluation of features and/or feature sets within the advisory trait may be utilized to indicate anomalous essay characteristics (e.g., discordance between test question and essay, overly repetitive word usage, etc.). To determine if the essay 204 is anomalous, the parser 302a-302n may be configured to compute three values derived from the content vector analysis program (described hereinabove). These values are z-scores for: a) type/token ratio, b) maximum cosine, and c) prompt cosine. These values measure the distance (with regard to word use) between a set of training essays and the test question topic. These variables may be utilized in the advisory feature set.

The value for the type/token ratio is the number of word types divided by number of word tokens in the essay 204. The value for the maximum cosine represents the highest cosine value among all cosines between an unseen essay and all training essays. The value for the prompt cosine refers to the cosine value between an essay and the text of the test question.

To calculate z-score, the mean value and the corresponding standard deviation (SD) for a) type/token, b) maximum cosine, or c) prompt cosine are computed based on the training essays for a particular test question. The formula for calculating the z-score for an new unseen essay is:

$$\text{z-score} = (\text{value} - \text{mean})/SD \quad \text{eqn. 4}$$

Z-score values may reflect the following anomalies: a) type/token may indicate the overly repetitious use of vocabulary in an essay, and b) maximum cosine and prompt cosine may indicate an essay that is off-topic. An example of a vector file for the advisory features is provided in the following Table 4.

TABLE 4

| Feature | Z-Score | Max Cosine | Prompt Cosine |
|---|---|---|---|
| Repetitive | 3, | 0.52, | 0.50, |
| Off-Topic | 4, | 0.48, | 0.44, |

As shown in the above Table 4, a z-score, maximum cosine value, and cosine value for the prompt are included in the vector for each of the identified features.

FIG. 4 is a diagram of a trait model (model) 400 according to an embodiment of the invention. As shown in FIG. 4, the model 400 may be illustrated as a plurality of branching segments 402 connected by a plurality of nodes 404. These segments form a plurality of paths through the model 400. Each path has an associated result. Based on the vector file, one path through the various segments may be determined and the associated result may be returned. This process is depicted by a relatively thicker path 406. Thus, in this example, a result of 5 may be returned. However, it is to be understood that embodiments are not limited to scoring results from 1 to 6, but rather, any suitable scoring system may be utilized (e.g., 0% to 100%, "A" to "F", "very poor" to "excellent" and the like).

In the following FIG. 5, training data is utilized to build an essay evaluation model, such as the model 400. In an embodiment of the invention, this training data may include essays and the like. In this regard, the training data may be similar to the essays described hereinabove.

Figure 5:
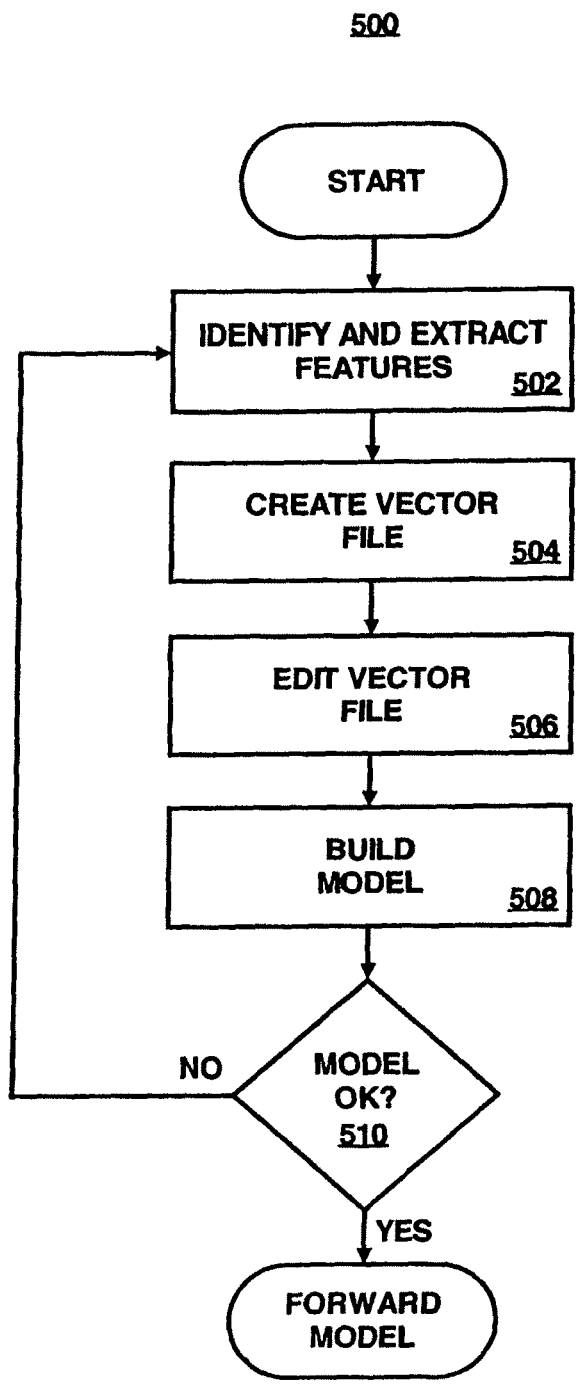
FIG. 5 is a flow diagram of a method for building a trait model according to an embodiment of the invention.

FIG. 5 is a flow diagram of a method 500 for building the model 400 according to an embodiment of the invention. While not shown in FIGS. 8 and 9, the method 500 may be implemented on a computer system (e.g., the computer system 900) and/or over a computer network (e.g., the computer network 800). Also not directly shown in the method 500 is the process of feature selection. In general, the features utilized to generate the model directly impact the performance of the model. Particular types of model performance issues may include bias and colinearity. Bias may occur if too few features are included. For example if word length (e.g., longer words directly correlate to higher essay score) alone is utilized to build a model, otherwise well written essays having relatively few long words may receive relatively low scores. System performance errors related to colinearity may occur if the model building features includes highly correlated features (e.g., if two or more features measure the same attribute of the essay). Therefore, feature selection may be based on a plurality of factors. These factors may include, for example, testing to substantially optimize model performance, empirically derived lists of features, and the like.

The method 500 may be initiated in response to receiving at least one evaluated essay (e.g., evaluated training data, corpus of evaluated essays, etc.). In one embodiment, approximately 300 evaluated essays may be included in this corpus. Each of these essay having been evaluated on upwards of 50 or more features, for example. The corpus may be generated in a variety of manners (see FIG. 7) and thus, any reasonable method of generating evaluated essays is within the scope of the invention. In an embodiment of the invention, the evaluated essays may be in the form of a plurality of essays discussing one or more topics. The plurality of essays having been evaluated by trained judges (see FIG. 7). In general, the evaluations may be utilized to grade a corpus of student essays. Furthermore, the method 500 is similar to the method 100 discussed hereinabove, and thus, only those steps that differ will be discussed hereinbelow. In the following description, a method of building one model is presented.

At steps 502-506, a vector file may be generated in a manner similar to steps 102-106. For example, in response to receiving the at least one evaluated essay, features of the essay are identified and extracted, the vector file may be created, and this vector file may be edited.

At step 508, in response to receiving the vector file, a model (e.g., the model 400) may be built. According to various embodiments of the invention, any suitable manner may be utilized to build the model 400. Examples of suitable model building methods include, but are not limited to stepwise regression, pattern examination by machine learning applications, and the like,.

According to one embodiment of the invention, stepwise regression analysis may be utilized to build the model 400. This training process selects those features that make significant contributions to the prediction of essay score. The result of training is a regression equation (e.g., a model) that may be applied to the features of an essay (e.g., the essay 204) to produce a predicted value. In general, stepwise regression analysis may be performed in a "forward," "backward," or "general" manner. In "forward" stepwise regression analysis a plurality of respective linear regression models may be generated for the extracted features. The respective performance of these models may be evaluated and the model with the best performance may be selected. A plurality of two-independent-feature models may be generated for each of the remaining features in combination with the selected linear regression model. This process may continue until substantially all of the features have been incorporated into a model.

In "backward" stepwise regression analysis, a model including essentially all features is constructed and features are successively removed based on the performance of these successive models. In "general" stepwise regression analysis, features may be added and/or removed in successive model building steps based on system performance at each step. This process may be repeated essentially independently for each of a plurality of feature sets (e.g., traits). In this manner, the plurality of models 212a-212n may be built.

According to another embodiment, a machine learning tool may be utilized to determine patterns relating the features to the evaluations of the corpus of essays. An example of a suitable machine learning tool may include C5.0™ from RuleQuest Research Pty Ltd, St Ives, Australia. In a manner similar to described herein above, this machine learning process may be repeated essentially independently for each of a plurality of feature sets (e.g., traits). In this manner, the plurality of models 212a-212n may be built.

At step 510, the model 400, may be evaluated. For example, the model 400 may be utilized in a method similar to the method 100 to evaluate an essay. The essay may be evaluated by an expert and/or judge (see FIG. 7) and a comparison of the human and automated evaluations may be performed. If the evaluations (e.g., scores) agree within a predetermined range, the model 400 may pass the evaluation and the model 400 may be forwarded to the AEEA 200. If the evaluations fail to agree within a predetermined range, the model 400 may fail the evaluation and the method 500 may return to step 502. Furthermore, although not shown in FIG. 5, it is within the scope of embodiments of the invention, that, in response to failure of the model 400, features utilized to generate the vector files and/or various aspects of generating the evaluated essays may be altered. For example, features may be added and/or removed from the traits (e.g., feature sets) utilized to construct the model 400.

Figure 6:
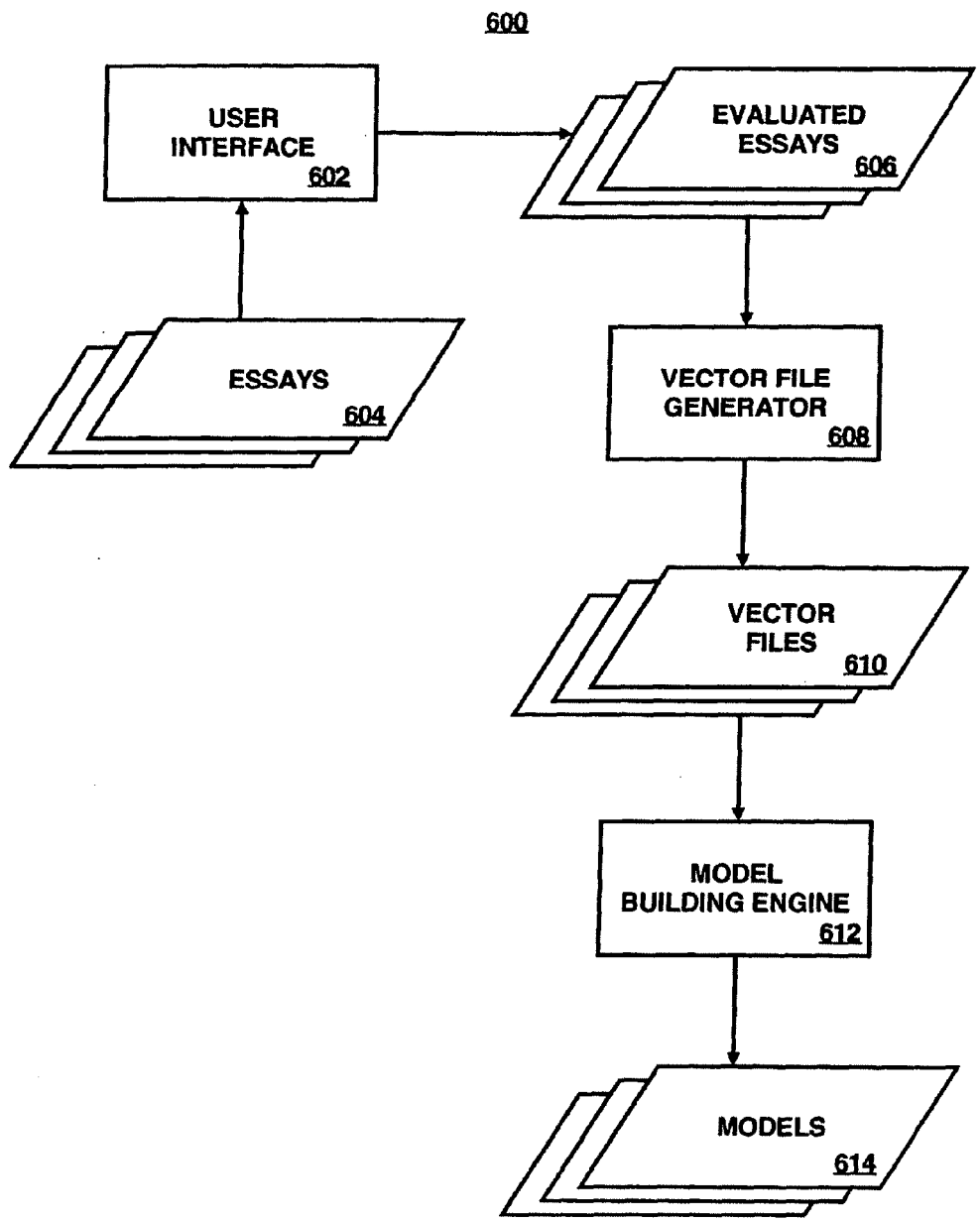
FIG. 6 is a block diagram of an architecture for an embodiment of an automated trait model builder application.

FIG. 6 is a block diagram of an architecture for an embodiment of an automated trait model builder application ("model builder") 600. While not shown in FIGS. 8 and 9, the model builder 600 may be implemented on a computer system (e.g., the computer system 900) and/or over a computer network (e.g., the computer network 800). As shown in FIG. 6, the model builder 600 includes a user interface 602, a vector file generator 608, and a model building engine 612.

The user interface 602 is configured to accept training data, such as a corpus of essays (corpus) 604 and present this corpus 604 to judges for evaluation. The evaluations may include scores and various other marks (e.g., indicators, etc.)

identifying the discourse elements of the corpus 604. While the evaluations may be generated in a variety of manners, in an embodiment of the invention, the user interface 602 is configured to accept manual evaluations of the corpus 604 from a trained judge (see FIG. 7). Additionally, the user interface 602 is configured to forward manually evaluated essays 606 to the vector file generator 608.

The vector file generator 608 of the model builder 600 is similar to the vector file generator 206 described hereinabove and thus only those features which are reasonably necessary for a complete understanding of the vector file generator 608 are described hereinbelow. One difference between the vector file generator 608 and the vector file generator 206 is that the vector file generator 608 is configured to receive, process, and/or forward data associated with the manual evaluations. In this regard, following extraction of features and generation of one or more vector files 610, the vector file generator 608 is configured to forward the one or more vector files 610 to the model building engine 612.

The model building engine 612 is configured to receive the one or more vector files 610 from the vector file generator 608 and generate a plurality of models 614 (similar to the model 400) based on the one or more vector files 610 and a predetermined trait (e.g., one or more features, feature sets, etc.). As discussed hereinabove, any suitable manner of model building is within the scope of various embodiments of the invention, and thus, the model building engine 612 may include, but is not limited to stepwise regression analysis, pattern examination by machine learning applications, and the like.

According to one embodiment of the invention, the model building engine 612 may be configured to perform stepwise regression analysis to select those features that make significant contributions to the prediction of essay score and build the models 614 based on those selected features. According to another embodiment, the model building engine 612 may include a machine learning tool (e.g., a data mining tool, etc.) configured to determine patterns relating the features to the evaluations of the corpus of essays. For example, the complexity and variety of sentence structure within an essay may be strongly correlated with the grade the essay receives. An example of a suitable machine learning tool may include C5.0™ (available from RuleQuest Research Pty Ltd, Australia). However, in other embodiments of the invention, various other machine learning tools, and the like, may be utilized to generate the models 614 and are thus within the scope of the invention. The model building engine 612 is further configured to forward the models 614 to the modeler 210.

In another embodiment, the model builder 600 may be configured to intercommunicate with a database such as the database 860. In this regard, the model builder 600 may be configured to execute autonomously and/or provide the user with the capability to select the corpus 604 from the database 860 for essay evaluation model building.

Figure 7:
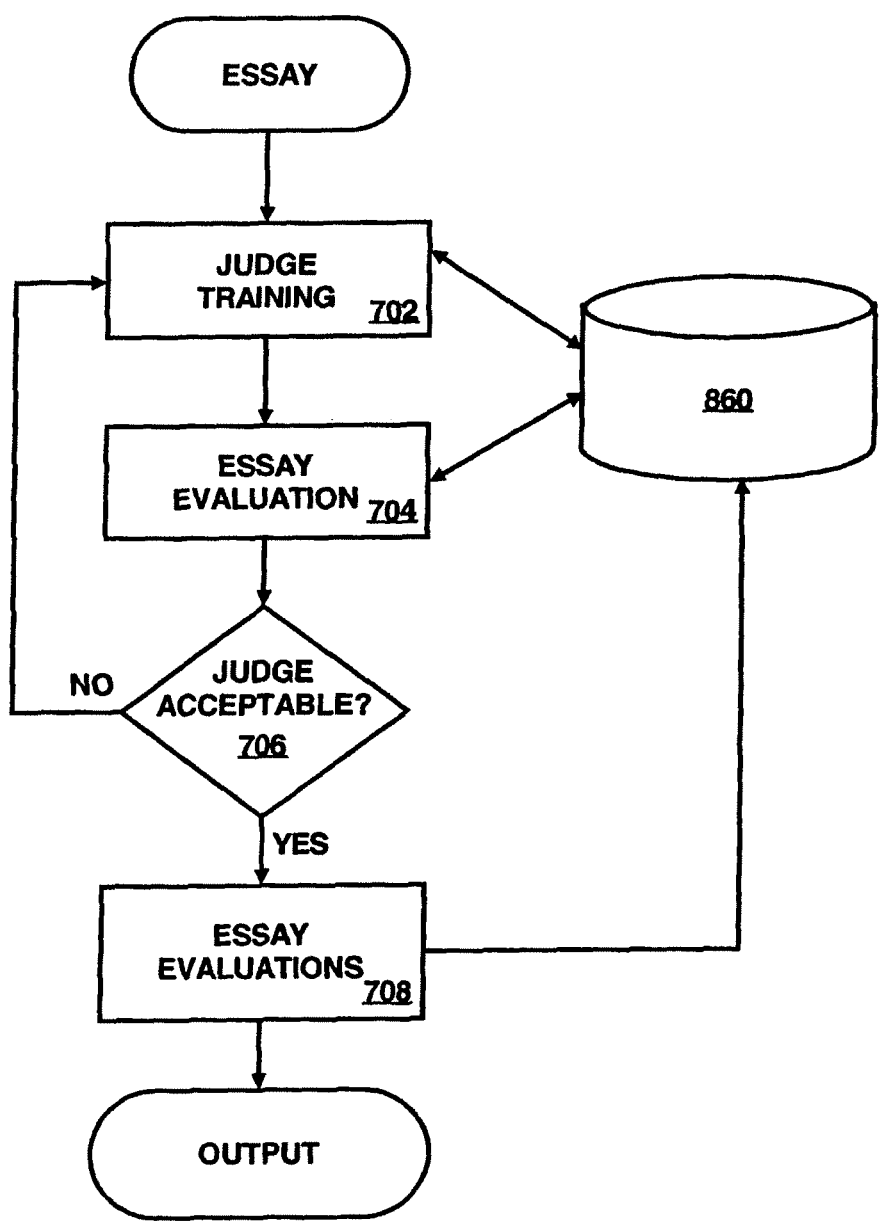
FIG. 7 is a flow diagram of a method for generating evaluated data according to an embodiment of the invention.

FIG. 7 is a flow diagram of a method 700 for generating evaluated essays according to an embodiment of the invention. As shown in FIG. 7, the method 700 is initiated in response to an expert and a judge receiving at least one essay from a database such as, a database 860 illustrated in FIG. 8 and described hereinbelow. The expert may be one or more persons generally recognized as having greater than average skill in the art of essay evaluation. The judge may be one or more persons of at least ordinary skill in the art of essay evaluation.

At step 702, the judge is trained by the expert. For example, the judge may observe the expert evaluate one or more essays. The judge and expert may discuss how and why particular evaluations are made, etc. In addition, while the essays are shown being received from the database 860, the essays may be received in any reasonable manner.

At step 704, one or more essays may be evaluated by the judge based on training received at step 702. For example, the judge may grade (e.g., evaluate) the one or more essays based on the number of writing errors, syntactic variety, use of grammar, mechanics, and style, organization and development, and vocabulary usage. These scores may be stored in the database 860.

At step 706, it is determined if the performance of the judge is acceptable. For example, essay evaluations performed by a first judge may be compared to evaluations of the same essays by the experts and/or a second judge. A level of agreement between the scores may be determined by calculating values for one or more of: Kappa, precision, recall and F-measure. In this regard, Kappa is a generally known equation for determining a statistical probability of agreement, excluding the probability of chance. Precision is a measure of agreement between the first judge and the second judge, divided by the number of evaluations performed by the first judge. Recall is a measure of agreement between the first judge and the second judge, divided by the number of evaluations performed by the second judge. F-measure is equal to two times precision times recall, divided by the sum of precision plus recall.

If the performance of the judge is determined to be unacceptable, the judge may receive more training at step 702. If the performance of the judge is determined to be acceptable, the judge may generate evaluated essays at step 708.

At step 708, evaluated essays may be generated by the judge. For example, the judge may receive essays from the database 860 and evaluate the essays. These evaluated essays may be forwarded to the AEEA 200 and/or the evaluated essays may be stored to the database 860.

Additionally, while in an embodiment of the invention it may be practical for the expert to train one or more judges. For example, if a relatively large number of essays are to be evaluated and doing so would be unduly burdensome to a relatively small number of experts, it may be advantageous to train a plurality of judges. In another embodiment of the invention, it may be more practical for the expert to act in the capacity of the judge or vise versa. For example, if there are a relatively low number of essays and the expert is capable of evaluating them in an expedient manner or a plurality of relatively skilled judges, requiring little or no training, may be located. Therefore, while judges and experts are discussed herein, it is within the scope of the invention utilize one or the other and thus, steps 702-706 may be optional.

Furthermore, although not shown in FIG. 7, the evaluated essays may be generated in a variety of manners and thus, any reasonable method of generating evaluated essays is within the scope of the invention. In an embodiment of the invention, the evaluated essays may be in the form of a plurality of essays discussing one or more topics. The plurality of essays having been evaluated by trained judges. In general, the evaluations may be utilized to grade student essays.

Figure 8:
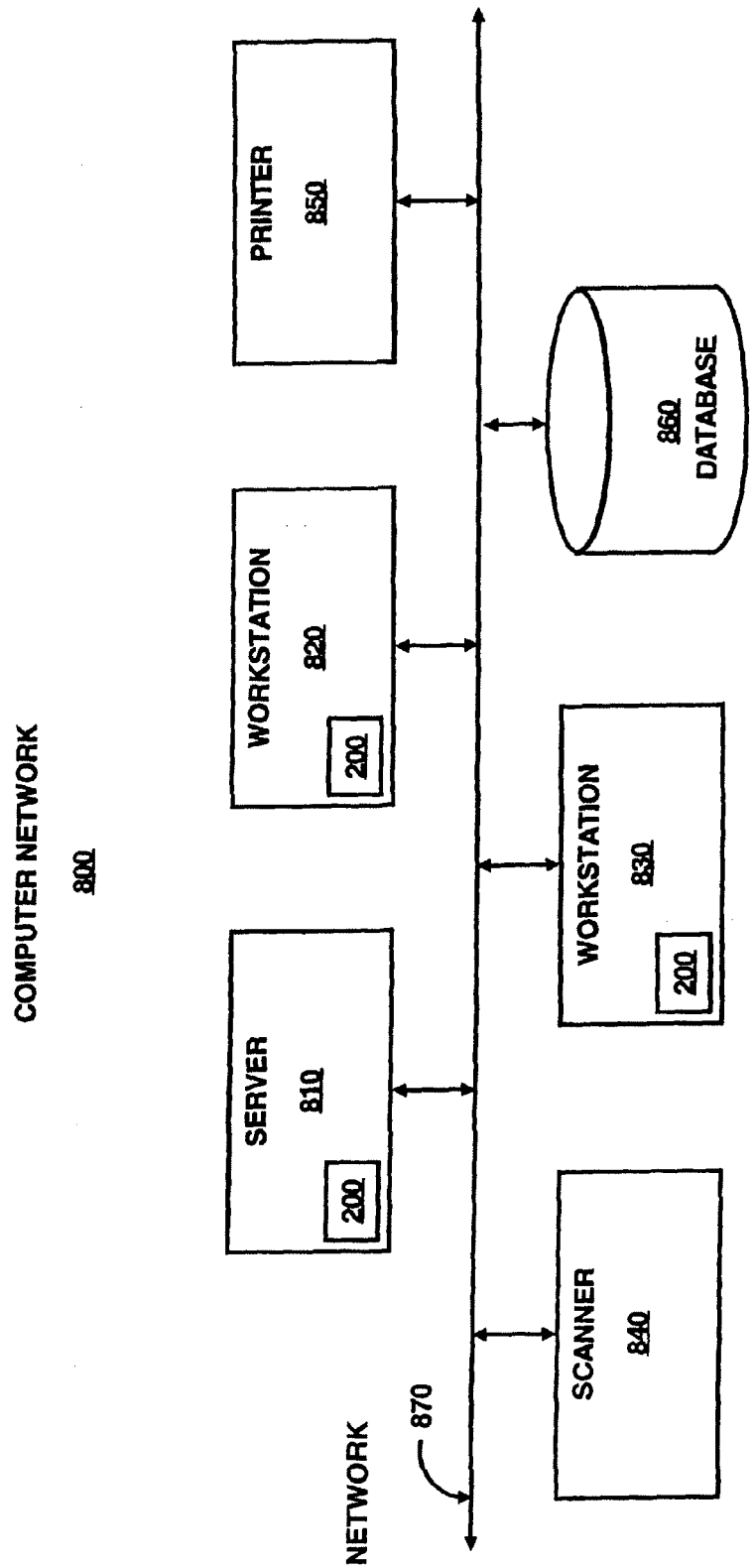
FIG. 8 is a block diagram of a computer network in which an embodiment of the invention may be implemented.

FIG. 8 is a block diagram of a computer network 800 in which an embodiment of the invention may be implemented. As shown in FIG. 8, the computer network 800 includes, for example, a server 810, workstations 820, and 830, a scanner 840, a printer 850, a database 860, and a network 870. The computer network 870 is configured to provide a communication path for each device of the computer network 800 to communicate with the other devices. Additionally, the computer network 870 may be the Internet, a public switched telephone network, a local area network, private wide area network, wireless network, and the like.

In various embodiments of the invention, the AEEA 200 may be executed on the server 810 and/or either or both of the workstations 820 and 830. For example, in an embodiment of the invention, the server 810 is configured to execute the AEEA 200, provide output for display to the workstations 820 and/or 830, and receive input from the workstations 820 and/or 830. In various other embodiments, one or both of the workstations 820 and 830 may be configured to execute the AEEA 200 individually or co-operatively.

The scanner 840 may be configured to scan textual content and output the content in a computer readable format. Additionally, the printer 850 may be configured to output the content to a print media, such as paper. Furthermore, data associated with: at least one essay; textual content; evaluated essay; and the like, may be stored on the database 860. The database 860 may additionally be configured to receive and/or forward some or all of the stored data. Moreover, in yet another embodiment, some or all of the computer network 800 may be subsumed within a single device.

Although FIG. 8 depicts computer network, it is to be understood that the invention is not limited to operation within a computer network, but rather, the invention may be practiced in any suitable electronic device. Accordingly, the computer network depicted in FIG. 8 is for illustrative purposes only and thus is not meant to limit the invention in any respect.

Figure 9:
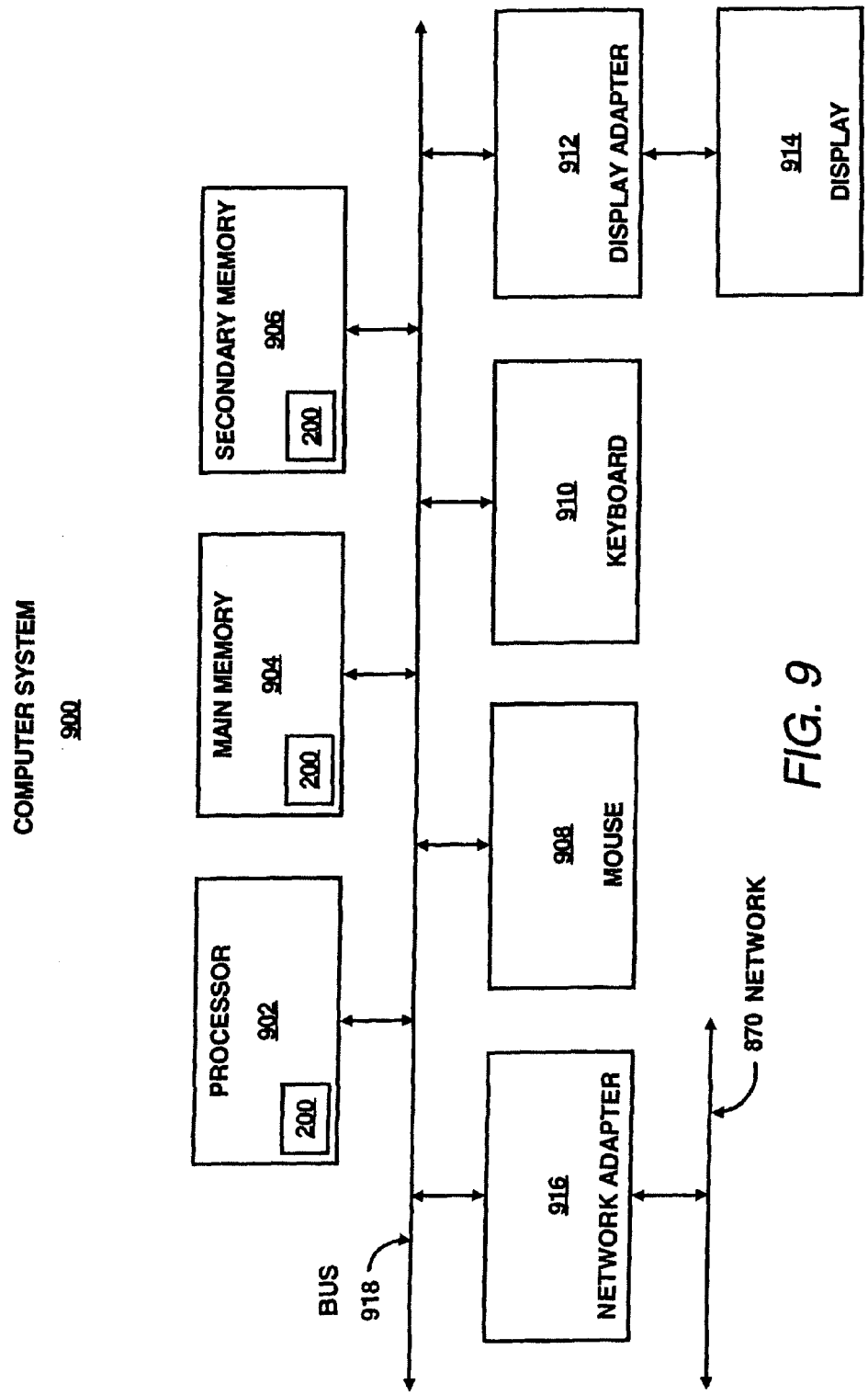
FIG. 9 is a block diagram of a computer system in which an embodiment of the invention may be implemented.

FIG. 9 is a block diagram of a computer system 900 in which an embodiment of the invention may be implemented. As shown in FIG. 9, the computer system 900 includes a processor 902, a main memory 904, a secondary memory 906, a mouse 908, a keyboard 910, a display adapter 912, a display 914, a network adapter 916, and a bus 918. The bus 918 is configured to provide a communication path for each element of the computer system 900 to communicate with the other elements.

The processor 902 is configured to execute a software embodiment of the AEEA 200. In this regard, a copy of computer executable code for the AEEA 200 may be loaded in the main memory 904 for execution by the processor 902 from the secondary memory 906. In addition to computer executable code, the main memory 904 and/or the secondary memory may store data, including essays, textual content, evaluated essays, tables of data, essay scores, and the like.

In operation, based on the computer executable code for an embodiment of the AEEA 200, the processor 902 may generate display data. This display data may be received by the display adapter 912 and converted into display commands configured to control the display 914. Furthermore, in a well known manner, the mouse 908 and keyboard 910 may be utilized by a user to interface with the computer system 900.

The network adapter 916 is configured to provide two way communication between the network 870 and the computer system 900. In this regard, the AEEA 200 and/or data associated with the AEEA 200 may be stored on the computer network 800 and accessed by the computer system 900.

The AEEA 200, the model builder 600 and the methods 100, 200, 500, and 700 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Examples of computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

Additionally, some or all of the users of the methods 500 and 700 may exist as software program(s). For example, some or all of the experts, judges, and users referred to herein may include software agents configured to generate essays, evaluate essays, and/or teach judges to evaluate essays. In this regard, the software agent(s) may exist in a variety of active and inactive forms.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

We claim:

1. A processor-implemented method to build a trait model for essay evaluation, comprising:
receiving at least one evaluated essay;
identifying and extracting with a processor a plurality of features pertaining to one or more traits from the received at least one evaluated essay;
wherein a trait comprises one or more features or feature sets and each feature set comprises one or more features;
wherein the one or more traits comprise writing errors, discourse, or vocabulary usage;
creating a plurality of vector files based upon the plurality of features;
building the trait model for essay evaluation based upon the plurality of vector files; and
evaluating the trait model, the evaluating including:
mapping features of a new essay to the trait model by navigating a multi-branched decision tree, and wherein at each branch of the decision tree, a value associated with the features of the new essay is used to determine how to proceed through the trait model.

2. The method of claim 1, wherein the plurality of features are identified based upon testing to substantially optimize model performance, or empirically derived lists of features.

3. The method of claim 1, wherein the received at least one evaluated essay discusses one or more topics.

4. The method of claim 1, wherein the received at least one evaluated essay has been evaluated by a judge trained by an expert.

5. The method of claim 4, wherein the judge evaluates an essay by grading the essay based on the number of writing errors, syntactic variety, use of grammar, mechanics, style, organization and development, and vocabulary usage.

6. The method of claim 1, wherein information associated with the plurality of features is stored to the plurality of vector files.

7. The method of claim 6, wherein information associated with the plurality of features comprises: absolute position, relative position, length in words of a paragraph, length in sentences of a paragraph, and presence of pre-determined words in a paragraph.

8. The method of claim 1, wherein the trait model is built based upon stepwise regression analysis, or pattern examination by machine learning applications.

9. The method of claim 1, wherein the received at least one evaluated essay has been evaluated on 50 or more features.

10. The method of claim 1, further comprising:
if the trait model fails to pass evaluation, building a new trait model.

11. The method of claim 1, the step of evaluating the trait model comprising:
identifying the features of the new essay, wherein the features of the new essay pertain to the one or more traits that are used for building the trait model;
determining a plurality of vectors for the features;
generating a plurality of vector files based on the plurality of vectors;
mapping the features of the new essay to the trait model, wherein mapping the features includes:
mapping the plurality of vector files to the trait model,
returning a mapping score for mapping of each of the plurality of vector files or each feature in one or more of the plurality of vector files,
calculating an automated essay score for the new essay based on the mapping scores,
receiving a human essay score for the new essay assigned by a judge or an expert who evaluates the new essay, and
comparing the automated essay score with the human essay score;
wherein the trait model passes evaluation if the automated essay score agrees with the human essay score within a predetermined range.

12. The method of claim 11, wherein the essay score is a mean value of the mapping scores;
wherein the mean value is calculated as an arithmetic mean, a geometric mean, a mean of a binomial distribution, a mean of a distribution function, a mean of a Gaussian distribution, a mean of a Poisson distribution, or a mean of a voting algorithm.

13. The method of claim 11, wherein the plurality of features of the new essay are identified using rule-based or statistical language modeling strategies.

14. A system for building a trait model for essay evaluation, the system comprising:
a data processor; and
computer-readable memory in communication with the data processor encoded with instructions for commanding the data processor to execute steps comprising:
receiving at least one evaluated essay;
identifying and extracting with a processor a plurality of features pertaining to one or more traits from the received at least one evaluated essay;
wherein a trait comprises one or more features or feature sets and each feature set comprises one or more features;
wherein the one or more traits comprise writing errors, discourse, or vocabulary usage;
creating a plurality of vector files based upon the plurality of features;
building the trait model for essay evaluation based upon the plurality of vector files. and
evaluating the trait model, the evaluating including:
mapping features of a new essay to the trait model by navigating a multi-branched decision tree, and wherein at each branch of the decision tree, a value associated with the features of the new essay is used to determine how to proceed through the trait model.

15. The system of claim 14, wherein the plurality of features are identified based upon testing to substantially optimize model performance, or empirically derived lists of features.

16. The system of claim 14, wherein information associated with the plurality of features is stored to the plurality of vector files.

17. The system of claim 16, wherein information associated with the plurality of features comprises: absolute position, relative position, length in words of a paragraph, length in sentences of a paragraph, and presence of pre-determined words in a paragraph.

18. The system of claim 14, wherein the trait model is built based upon stepwise regression analysis, or pattern examination by machine learning applications.

19. The system of claim 14, wherein the steps to be executed by the data processor further comprising:
if the trait model fails to pass evaluation, building a new trait model for essay evaluation.

20. The system of claim 14, wherein the received at least one evaluated essay discusses one or more topics.

21. The system of claim 14, wherein the received at least one evaluated essay has been evaluated by a judge trained by an expert.

22. The system of claim 21, wherein the judge evaluates an essay by grading the essay based on the number of writing errors, syntactic variety, use of grammar, mechanics, style, organization and development, and vocabulary usage.

23. The system of claim 14, wherein the received at least one evaluated essay has been evaluated on 50 or more features.

24. The system of claim 14, the step of evaluating the trait model comprising:
identifying the features of the new essay, wherein the features of the new essay pertain to the one or more traits that are used for building the trait model;
determining a plurality of vectors for the features;
generating a plurality of vector files based on the plurality of vectors;
mapping the features of the new essay to the trait model, wherein mapping the features includes:
mapping the plurality of vector files to the trait model,
returning a mapping score for mapping of each of the plurality of vector files or each feature in one or more of the plurality of vector files,
calculating an automated essay score for the new essay based on the mapping scores,
receiving a human essay score for the new essay assigned by a judge or an expert who evaluates the new essay, and
comparing the automated essay score with the human essay score;
wherein the trait model passes evaluation if the automated essay score agrees with the human essay score within a predetermined range.

25. The system of claim 24, wherein the essay score is a mean value of the mapping scores;
wherein the mean value is calculated as an arithmetic mean, a geometric mean, a mean of a binomial distribution, a mean of a distribution function, a mean of a Gaussian distribution, a mean of a Poisson distribution, or a mean of a voting algorithm.

26. The system of claim 24, wherein the plurality of features of the new essay are identified using rule-based or statistical language modeling strategies.

27. A non-transitory computer-readable storage medium for building a trait model for essay evaluation, the computer-readable storage medium comprising computer executable instructions which, when executed, cause the computer system to execute steps comprising:
receiving at least one evaluated essay;
identifying and extracting with a processor a plurality of features pertaining to one or more traits from the received at least one evaluated essay;
wherein a trait comprises one or more features or feature sets and each feature set comprises one or more features;
wherein the one or more traits comprise writing errors, discourse, or vocabulary usage;
creating a plurality of vector files based upon the plurality of features;
building the trait model for essay evaluation based upon the plurality of vector files; and
evaluating the trait model, the evaluating including:
mapping features of a new essay to the trait model by navigating a multi-branched decision tree, and wherein at each branch of the decision tree, a value associated with the features of the new essay is used to determine how to proceed through the trait model.

28. The non-transitory computer-readable storage medium of claim 27, wherein the plurality of features are identified based upon testing to substantially optimize model performance, or empirically derived lists of features.

29. The non-transitory computer-readable storage medium of claim 27, wherein the received at least one evaluated essay discusses one or more topics.

30. The non-transitory computer-readable storage medium of claim 27, wherein the received at least one evaluated essay has been evaluated by a judge trained by an expert.

31. The non-transitory computer-readable storage medium of claim 30, wherein the judge evaluates an essay by grading the essay based on the number of writing errors, syntactic variety, use of grammar, mechanics, style, organization and development, and vocabulary usage.

32. The non-transitory computer-readable storage medium of claim 27, wherein information associated with the plurality of features is stored to the plurality of vector files.

33. The non-transitory computer-readable storage medium of claim 32, wherein information associated with the plurality of features comprises: absolute position, relative position, length in words of a paragraph, length in sentences of a paragraph, and presence of pre-determined words in a paragraph.

34. The non-transitory computer-readable storage medium of claim 27, wherein the trait model is built based upon stepwise regression analysis, or pattern examination by machine learning applications.

35. The non-transitory computer-readable storage medium of claim 27, wherein the received at least one evaluated essay has been evaluated on 50 or more features.

36. The non-transitory computer-readable storage medium of claim 27, further comprising:
if the trait model fails to pass evaluation, building a new trait model.

37. The non-transitory computer-readable storage medium of claim 27, the step of evaluating the trait model comprising:
identifying the features of the new essay, wherein the features of the new essay pertain to the one or more traits that are used for building the trait model;
determining a plurality of vectors for the features;
generating a plurality of vector files based on the plurality of vectors;
mapping the features of the new essay to the trait model, wherein mapping the features includes:
mapping the plurality of vector files to the trait model,
returning a mapping score for mapping of each of the plurality of vector files or each feature in one or more of the plurality of vector files,
calculating an automated essay score for the new essay based on the mapping scores,
receiving a human essay score for the new essay assigned by a judge or an expert who evaluates the new essay, and
comparing the automated essay score with the human essay score;
wherein the trait model passes evaluation if the automated essay score agrees with the human essay score within a predetermined range.

38. The non-transitory computer-readable storage medium of claim 37, wherein the essay score is a mean value of the mapping scores;
wherein the mean value is calculated as an arithmetic mean, a geometric mean, a mean of a binomial distribution, a mean of a distribution function, a mean of a Gaussian distribution, a mean of a Poisson distribution, or a mean of a voting algorithm.

39. The non-transitory computer-readable storage medium of claim 37, wherein the plurality of features of the new essay are identified using rule-based or statistical language modeling strategies.

40. A processor-implemented method to build a trait model for essay evaluation, comprising:
receiving at least one evaluated essay;
identifying and extracting with a processor a plurality of features pertaining to one or more traits from the received at least one evaluated essay;
wherein a trait comprises one or more features or feature sets and each feature set comprises one or more features;
wherein the one or more traits comprise writing errors, discourse, or vocabulary usage;
creating a plurality of vector files based upon the plurality of features;
building the trait model for essay evaluation based upon the plurality of vector files;
evaluating the trait model, wherein evaluating the trait model includes:
identifying a plurality of features of a new essay pertaining to the one or more traits that are used for building the trait model,
determining a plurality of vectors for the plurality of features,
generating a plurality of vector files based on the plurality of vectors,
mapping the plurality of vector files to the trait model, wherein each of the plurality of vector files is mapped to the trait model by navigating a multi-branched decision tree, wherein at each branch of the decision tree, a value associated with a feature from the vector file is used to determine how to proceed through the trait model,
returning a mapping score for mapping of each of the plurality of vector files or each feature in one or more of the plurality of vector files,
calculating an automated essay score for the new essay based on the mapping scores, receiving a human essay score for the new essay assigned by a judge or an expert who evaluates the new essay, and comparing the automated essay score with the human essay score, wherein the trait model passes evaluation if the automated essay score agrees with the human essay score within a predetermined range; and if the trait model fails to pass evaluation, building a new trait model.

41. A system for building a trait model for essay evaluation, the system comprising:

a data processor; and computer-readable memory in communication with the data processor encoded with instructions for commanding the data processor to execute steps comprising:

receiving at least one evaluated essay;

identifying and extracting with a processor a plurality of features pertaining to one or more traits from the received at least one evaluated essay;

wherein a trait comprises one or more features or feature sets and each feature set comprises one or more features;

wherein the one or more traits comprise writing errors, discourse, or vocabulary usage;

creating a plurality of vector files based upon the plurality of features;

building the trait model for essay evaluation based upon the plurality of vector files;

evaluating the trait model, wherein evaluating the trait model includes:

identifying a plurality of features of a new essay pertaining to the one or more traits that are used for building the trait model, determining a plurality of vectors for the plurality of features, generating a plurality of vector files based on the plurality of vectors, mapping the plurality of vector files to the trait model, wherein each of the plurality of vector files is mapped to the trait model by navigating a multi-branched decision tree, wherein at each branch of the decision tree, a value associated with a feature from the vector file is used to determine how to proceed through the trait model, returning a mapping score for mapping of each of the plurality of vector files or each feature in one or more of the plurality of vector files, calculating an automated essay score for the new essay based on the mapping scores, receiving a human essay score for the new essay assigned by a judge or an expert who evaluates the new essay, and comparing the automated essay score with the human essay score, wherein the trait model passes evaluation if the automated essay score agrees with the human essay score within a predetermined range; and if the trait model fails to pass evaluation, building a new trait model.

42. A non-transitory computer-readable storage medium for building a trait model for essay evaluation, the computer-readable storage medium comprising computer executable instructions which, when executed, cause the computer system to execute steps comprising:

receiving at least one evaluated essay;

identifying and extracting with a processor a plurality of features pertaining to one or more traits from the received at least one evaluated essay;

wherein a trait comprises one or more features or feature sets and each feature set comprises one or more features;

wherein the one or more traits comprise writing errors, discourse, or vocabulary usage;

creating a plurality of vector files based upon the plurality of features;

building the trait model for essay evaluation based upon the plurality of vector files;

evaluating the trait model, wherein evaluating the trait model includes:

identifying a plurality of features of a new essay pertaining to the one or more traits that are used for building the trait model, determining a plurality of vectors for the plurality of features, generating a plurality of vector files based on the plurality of vectors, mapping the plurality of vector files to the trait model, wherein each of the plurality of vector files is mapped to the trait model by navigating a multi-branched decision tree, wherein at each branch of the decision tree, a value associated with a feature from the vector file is used to determine how to proceed through the trait model, returning a mapping score for mapping of each of the plurality of vector files or each feature in one or more of the plurality of vector files, calculating an automated essay score for the new essay based on the mapping scores, receiving a human essay score for the new essay assigned by a judge or an expert who evaluates the new essay, and comparing the automated essay score with the human essay score, wherein the trait model passes evaluation if the automated essay score agrees with the human essay score within a predetermined range; and if the trait model fails to pass evaluation, building a new trait model.

* * * * *